(12) United States Patent
Wang et al.

(10) Patent No.: US 6,653,009 B2
(45) Date of Patent: Nov. 25, 2003

(54) SOLID OXIDE FUEL CELLS AND INTERCONNECTORS

(75) Inventors: Conghua Wang, Wayne, PA (US); Ponnusamy Palanisamy, Lansdale, PA (US); Mark Stuart Hammond, Pennington, NJ (US); Barry Jay Thaler, Lawrenceville, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 10/160,782

(22) Filed: May 30, 2002

(65) Prior Publication Data

US 2003/0082434 A1 May 1, 2003

Related U.S. Application Data

(60) Provisional application No. 60/345,195, filed on Oct. 19, 2001.

(51) Int. Cl.$^7$ ................................. H01M 8/10
(52) U.S. Cl. .............. 429/30; 429/33; 429/32; 429/36; 429/38; 429/39; 429/40; 429/41; 429/44; 427/115; 427/126.3; 427/126.6; 427/372.2; 29/623.1; 29/623.5; 29/623.3
(58) Field of Search ............... 427/115, 126.3, 427/126.6, 372.2; 429/30, 33, 40, 41, 44, 36, 32, 38.39; 29/623.1, 623.5, 623.3

(56) References Cited

U.S. PATENT DOCUMENTS

| | | | |
|---|---|---|---|
| 2,966,719 A | 1/1961 | Park, Jr. ................. | 25/156 |
| 3,192,086 A | 6/1965 | Gyurk ..................... | 156/89 |
| 4,913,982 A | 4/1990 | Kotchick et al. ....... | 429/12 |
| 4,925,745 A | 5/1990 | Remick et al. .......... | 429/40 |
| 4,929,295 A | 5/1990 | Kohno et al. ........... | 156/230 |
| 4,985,098 A | 1/1991 | Kohno et al. ........... | 156/89 |
| 5,057,362 A | 10/1991 | Schroeder et al. ..... | 428/312.2 |
| 5,071,718 A | 12/1991 | Marianowski et al. .. | 429/16 |
| 5,122,425 A * | 6/1992 | Yoshida et al. ......... | 429/33 |
| 5,162,167 A | 11/1992 | Minh et al. ............. | 429/30 |
| 5,256,499 A | 10/1993 | Minh et al. ............. | 429/33 |
| 5,298,235 A | 3/1994 | Worrell et al. ......... | 429/33 |
| 5,368,667 A | 11/1994 | Minh et al. ............. | 156/89 |
| 5,585,203 A | 12/1996 | Chikagawa et al. .... | 429/35 |
| 5,591,537 A * | 1/1997 | Bagger et al. .......... | 429/33 |
| 6,228,520 B1 | 5/2001 | Chiao ..................... | 429/32 |
| 6,251,473 B1 * | 6/2001 | Wang et al. ............ | 427/126.3 |
| 6,280,868 B1 | 8/2001 | Badwal et al. .......... | 429/34 |
| 6,291,091 B1 | 9/2001 | Preischl et al. ........ | 429/30 |
| 6,436,565 B1 * | 8/2002 | Song et al. ............. | 429/31 |
| 6,492,051 B1 * | 12/2002 | Gopalan et al. ........ | 429/31 |
| 2001/0029231 A1 | 10/2001 | Gorte et al. ............ | 502/101 |

OTHER PUBLICATIONS

Ihringer et al, "Development of thin film electrolytes co–fired with NiO–YSZ substrates", Electrochem. Proceedings, vol 97–18, 1997, pp340–357.

Minh, "Ceramic Fuel Cells", J. Am. Ceram. Soc. 76(3) 1993, pp563–386.

* cited by examiner

Primary Examiner—Bruce F. Bell
(74) Attorney, Agent, or Firm—William J. Burke

(57) ABSTRACT

Solid oxide fuel cells made by coating a slurry of an electrolyte having a limited amount of organic material onto a carrier tape, depositing a one or two layer electrode material on the tape sufficient to support the electrolyte layer, removing the tape, screen printing a second electrode layer on the exposed surface of the electrolyte layer, and firing the layers at a temperature of 1100–1300° C. The resultant fired fuel cell can be mounted on an interconnector comprising a base plate, grooves formed in one face of the base plate, a porous conductive ceramic contact layer between the base plate and an overlying blocking layer of a porous conductive layer to provide electrical contact between the base plate and the blocking layer, or an interconnector having a fired green tape stack having conductive via contacts and air and gas flow channels formed therein. A sealing glass bonds the overlying layers to the base plate. Such interconnector-mounted fuel cells can be stacked together to increase the voltage output of the fuel cells which can be used to power a load.

36 Claims, 5 Drawing Sheets

SOLID OXIDE FUEL CELLS AND INTERCONNECTORS

This application claims the benefit of U.S. provisional Application Ser. No. 60/345,195 filed Oct. 19, 2001.

This invention relates to novel designs for solid oxide fuel cells (hereinafter SOFC) that can convert the chemical energy of fuel and oxidant (air) directly to electrical and heat energy. More particularly, this invention relates to planar SOFCs, novel interconnectors, SOFC stacks, methods for fabricating them, and apparatus including them.

BACKGROUND OF THE INVENTION

Fuel cells are electrochemical devices that convert the chemical energy of fuel and oxidant (air) directly to electrical energy and heat energy. A fuel cell consists of two electrodes, an anode and a cathode, with an electrolyte layer between them. Fuel, such as hydrogen, hydrocarbons or carbon monoxide, is continually fed to the anode and oxidized there to release electrons to an external circuit. An oxidant, such as air, is continually fed to the cathode and reduced there, accepting electrons from the anode through the external circuit. The electrolyte is a gas-tight, pure ionic conductive membrane through which only reactive ions can be transmitted Such fuel cells have high energy conversion efficiency, since the fuel cell generates electrical energy from chemical energy directly, without any intermediate thermal and/or mechanical energy conversions. Generally a series of such cells are operated together in a stack to provide higher voltage, wherein an interconnector connects the anode of one cell to the cathode of the next cell in the stack.

Current thin film solid oxide fuel cells comprise an anode supporting electrode, a cathode electrode, and a thin film electrolyte between them.

As shown in FIG. 1, a dense, thin electrolyte layer 14 about 10 microns thick is deposited between a porous anode support layer 12 and a porous cathode layer 10. The cathode layer 10 can also be used as the supporting substrate for the thin film electrolyte layer 14.

These fuel cells have traditionally been made by depositing the electrolyte layer 14 on the anode layer 12; sintering the bi-layer at high temperatures of about 1400° C.; screen printing the cathode layer 10 on the other side of the electrolyte layer 14; and sintering the resulting tri-layer at about 1250° C. The need for two firing steps adds to the cost of manufacture, and, because of the difficulty of obtaining a For continuous electrode reactions. Electrons flow through the external circuit from anode to cathode, producing direct current electricity. strong bond between the cathode 10 and the sintered electrolyte layer 14, good cathode/electrolyte interface properties are not obtained.

One type of ceramic fuel cell has been made by casting a plurality of green tapes comprising an oxide powder and an organic vehicle, including plasticizers, binders, dispersants and the like, for each green tape layer, and stacking them together. The layers are laminated at a predetermined temperature and pressure to obtain a monolithic multilayer green tape stack. The stack is then sintered at high temperatures to remove the organic materials and to form a single solid body.

In order to maintain good bonding between the different layers, it is necessary to keep a high plasticity in the green tape slurry, using sufficient organic additives, typically about 10% by weight of the slurry, of binders and plasticizers. When sub-micron size ceramic powders are to be added however, more organic additives are needed, on the order of about 20–30% by weight of the slurry, in order to obtain good strength and flexibility in the green tape. However, these organic additives decrease the concentration of the ceramic particles, and increase the sintering temperature needed to obtain a fully densified layer. If a thin film layer, i.e., the electrolyte layer, is included in the multilayer structure, this traditional process has to face the challenges of handling the thin film green tape, and ensuring uniformity of the thin film layer thickness after lamination.

Different types of fuel cells are known, typically named for the electrolyte it uses. Solid oxide fuel cells use a solid ceramic as the electrolyte. Planar fuel cells use a solid, thin, flat plate ceramic as the electrolyte, which can be an oxygen ion conductor or a proton conductor. The operating temperature is above 400° C. and generally is about 600–800° C. with high output power density. This high temperature promotes rapid kinetics with non-precious catalyst materials, allows use of hydrocarbon fuels directly, and generates heat as a by-product. However, due to these elevated temperatures, the materials and stack design must adhere to rigorous requirements, both for the materials used and the stack design.

For example, high temperature seals are required at the edges of the electrolyte layers, which are difficult to make. Compressive seals, cement seals and glass seals have been proposed. Compressive seals, using metal rings, can lead to non-uniform stress distribution on the ceramic, causing cell cracks and unstable bonds of the cells to succeeding layers. Gas-tight cement seals are difficult to form. Glass seals are difficult to maintain and they make stack assembly difficult.

A typical thin film electrolyte can be 8 mol % yttria stabilized zirconia, hereinafter YSZ or Y8SZ. Various known methods can be used to make the dense thin film electrolyte, including tape calendering, colloid spray coating, plasma spray coating, sol-gel deposition, sputtering, dip coating, tape cast-laminating and screen printing. However, these various methods have problems of high cost, high processing temperatures and limitations on the materials from which the support anode is made.

A suitable anode can be a porous Ni-YSZ cermet about 500–2000 microns thick, to provide mechanical strength; and the cathode can be a Sr doped lanthanum manganite-(LSM)-YSZ composite about 50 microns thick. Another advantage of using Ni-Y8SZ as the supporting anode is that NiO-YSZ composite, the starting material for the Ni-Y8SZ anode, is stable with YSZ electrolyte at the high sintering temperature of 1400° C. The Ni-Y8SZ, for the most part, is a good anode material with excellent electrical and catalytic properties.

However, the above porous support anode cannot be used with dry hydrocarbon fuels because carbon deposits rapidly in the anode at SOFC working temperatures. Further, this layer, e.g., of Ni-YSZ, must be quite thick, over 500 microns, to provide adequate mechanical support, although the effective reaction zone is a surface layer only about 10–50 microns thick. The thickness of the anode layer will slow down mass transport of fuel gases in the porous anode, and will decrease fuel utilization of the cell.

The cathode suitably can be made of a porous layer about 50 microns thick of a composite of strontium doped lanthanum manganite ($LaMnSrO_3$) or LSM and Y8SZ.

In order to increase the voltage generated by a SOFC. a stack or series of such fuel cells is made, connected together by means of an interconnector that connects the cathode of one cell to the anode of the adjacent cell.

The interconnector materials must be electrically conductive, strong and tough at operating temperatures of 650–800° C.; must be chemically and physically stable and non-reactive to other components of the SOFC in both oxidizing and reducing atmospheres at high operating temperatures of 600–800° C.; must have low surface/interface electrical or ohmic resistance; and must have a TCE (thermal coefficient of expansion) that is closely matched to the ceramic components, about $10–11 \times 10^{-6}/°$ C. Further, air and fuel channels must be machined or otherwise formed into the interconnector. These requirements limit the choices of suitable materials from which to make the interconnectors. Conductive ceramics, such as doped lanthanum chromites, are expensive and difficult to machine. Metal interconnects corrode in the presence of reactive gases at high temperatures, weakening them structurally.

High temperature metal alloys have been tried to make interconnectors, such as nickel-based high temperature alloys. However, they have a higher TCE than other components of the SOFC stack, and they are too expensive for commercial applications.

Due to their low cost and CTE compatibility with ceramic components, Cr-containing ferric high temperature alloys, such as stainless steel, have been used as interconnector materials. However, their stability at temperatures of 650–800° C. is not good enough because of their instability to oxygen. A plasma spray coating has been applied to these alloys in order to block oxygen from the contacting surface, but good, stable, conducting oxide protective layers are difficult to apply to grooved surfaces. Further, there is a continual slow corrosion on the fuel side of Cr-containing interconnector alloys. Thus there is a need for improved interconnector designs.

It would be highly desirable to provide a new, low temperature fabrication process for thin film cell manufacture. Novel electrode materials could be incorporated into the cell to improve fuel cell performance. It would also be highly desirable to provide a reliable interconnector and cell stack sealing method to improve cell stack performance, including long term and thermal cycling stability.

SUMMARY OF THE INVENTION

Planar SOFC stacks of the invention comprise green tape layers that have been laminated together. A three layer cell is made of a first porous electrode that supports a thin film electrolyte layer, and a second electrode on the opposite side of the electrolyte layer. The support can also be a separate layer from the first electrode. The green tapes are made from sub-micron sized ceramic particles and an organic vehicle, comprising about 3–15% by weight, and preferably about 10% by weight, of binders and plasticizers. Limiting the amount of organic additives results in a higher ceramic particle packing density in the green tape.

In accordance with the present method of manufacture, the electrolyte layer is cast onto a carrier tape, and a first electrode or electrode-support, generally the anode layer, is cast onto the electrolyte layer. The carrier tape is removed and the second or cathode electrode is deposited over the exposed electrolyte layer, as by screen printing. The resultant fuel cell layers are fired to densify the electrolyte layers and to remove the organics. As explained above, a limited amount of organic additives, including dispersants, binders and plasticizers, is used for the electrolyte layer.

By choosing solvents for the second electrode layer that only partially dissolve the binders in the electrolyte layer, and by supporting the electrolyte layer onto a multilayer stack, damage to the thin electrolyte layer is minimized and good bonding between the layers is achieved.

The resultant trilayer is then fired at about 1200–1300° C. in air to remove the organics and densify the layers. A good interface between the electrolyte and the two electrode layers is obtained. Only a single firing step is required, at a reduced temperature.

The thin film electrolyte layers can be sintered to full density at lower temperatures because of their high particle packing density. In turn, the low sintering temperature will decrease the fabrication costs for each fuel cell, and provide more options for active material selection than higher sintering temperature materials.

Unique designs for a cell stack required for SOFC stacks, are also part of the present invention.

Sealing glass components are used at the edge of the cell and interconnector to bond a ceramic spacer on the top of the interconnector. A metal gasket is mounted on the ceramic spacer to provide a compressive seal between repeating units A flexible anode contact layer, as of metallic mesh, connects the anode with the interconnector of the next cell.

The first interconnector of the invention is made with a metal alloy base plate, a dense conductive ceramic blocking layer with air flow channels, a porous conductive ceramic layer and a glass bonding layer. The metal alloy base plate can be grooved or bonded with mesh to provide efficient fuel transport.

Still another design of the invention utilizes a metal base layer bonded to a ceramic layer. Gas and air channels are readily formed in the ceramic layer prior to firing. Contact vias are also formed integrally with the ceramic layers in known manner and filled with a conductor, as with a conductive via ink.

The present fuel cell stacks can be used to power a load, such as a rechargeable power source or an external power supply to generate power start-up.

DETAILED DESCRIPTION OF THE INVENTION

Figure 1:
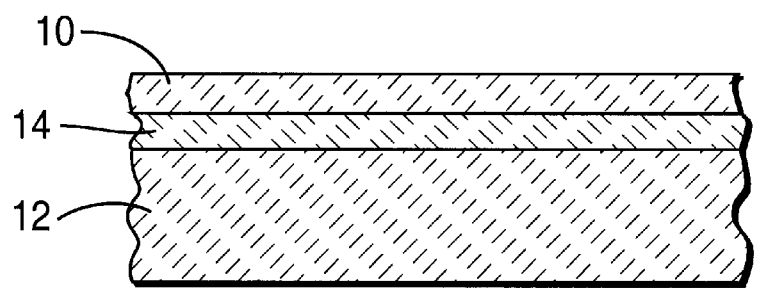
FIG. 1 is a schematic view of a SOFC repeating unit of the prior art.
Figure 2:
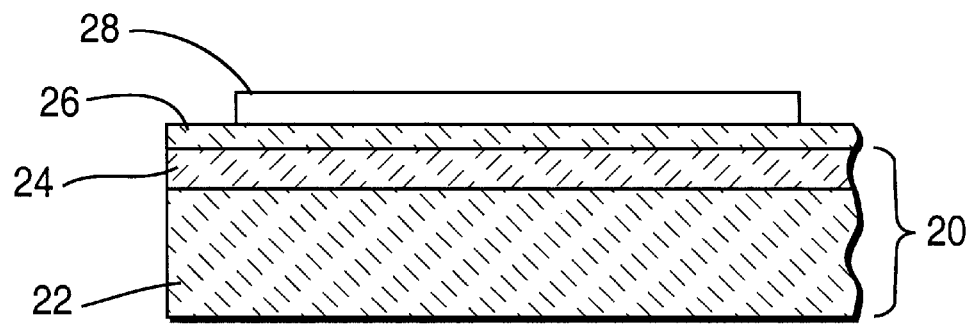
FIG. 2 is a schematic view of an anode supported SOFC cell of the invention.

One repeating unit of an anode supported SOFC of the invention is shown in FIG. 2. The supporting anode 20 of the invention is made from two layers; a support layer 22 is a porous composite of nickel and partially stabilized zirconia (PSZ), such as 3% yttria stabilized zirconia (Y3SZ) or Ni-Y3SZ-alumina composite. The thickness of this layer is about 100–1000 microns, preferably about 200–500 microns. A thin porous Ni-Y8SZ anode layer 24, where anode reactions will take place, is supported by the support layer 22. The thickness of this layer is about 5–50 microns, preferably about 10–20 microns.

A thin (5–50 microns), dense, electrolyte layer 26 of Y8SZ is deposited between the anode layer and a porous, thin cathode layer 28, that can be of Sr doped lanthanum manganite, $LaMnO_3$, or (LSM)-Y8SZ composite, about 50 microns thick. This completes one fuel cell.

Other partially stabilized zirconia materials, such as MgO-, CaO-, $La_2O_3$- and $Sc_2O_3$-doped zirconia, and their composites can also be used. The separate supporting layer 22 has a coarser microstructure and a higher porosity than the electrode layer, leading to better gas diffusion to the reaction zone.

Figure 3:
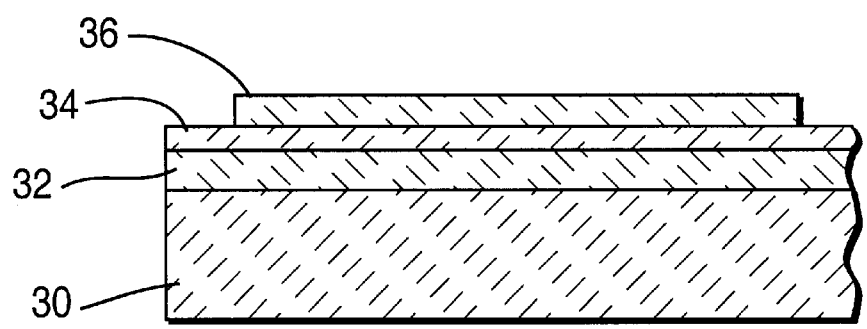
FIG. 3 is a schematic view of a cathode supported SOFC cell of the invention.

A novel cathode supported SOFC is shown in FIG. 3 and comprises a thick, porous, conductive support substrate (LSM) 30, and an LSM-YSZ composite layer 32 thereover. A thin film porous anode layer 36 is deposited over the electrolyte layer 34. The anode layer 36 can suitably be Ni-Y8SZ, Cu-YSZ or an all-oxide anode, such as a composite of doped lanthanum chromite ($LaCrO_3$) with YSZ, or a composite of $SrTiO_4$ with YSZ. The electrolyte layer 34 is again of Y8SZ. The cathode can be a layer of LSM-Y8SZ and the support layer can be porous LSM-PSZ.

Thus the sequential layers can be LSM/LSM-Y8SZ/Y8SZ/Ni-Y8SZ.

Because partially stabilized zirconia (PSZ) has 5–10 times the mechanical strength of prior supports, and better thermal shock resistance than fully stabilized $ZrO_2$, the cell of FIG. 2 or FIG. 3 has improved mechanical properties using a thinner support layer 22 or 30. This thinner support layer reduces materials cost and reduces the gas diffusion distance in the porous substrate for better performance. The electrode performance and electrical conduction however are not affected.

The partially stabilized zirconia (PSZ) useful herein can be Y3SZ, a composite with alumina, and partially stabilized $ZrO_2$ with MgO, CaO, $La_2O_3$ or $Sc_2O_3$. The Ni-PSZ support layer 30 should be porous and coarse, for better gas diffusion to the reaction zone. This layer can be from about 100 to 1000 microns thick, but is preferably about 200–500 microns thick. A thin, porous Ni-Y8SZ anode layer is mounted between the support layer and the electrolyte layer which is about 5–50 microns, preferably about 10–20 microns, in thickness. A LSM-Y8SZ porous cathode is deposited on the other side of the electrolyte layer.

In the all-oxide anode, a conductive, stable (in both oxidizing and reducing atmospheres) oxide, such as doped $LaCrO_3$ or doped $SrTiO_4$, is used as the electronic conductive component in the anode, and an ionic conductive oxide, such as YSZ or doped ceriun oxide or ceria, is used as the ionic conductive component in the cathode. In order to promote the electrode reactions, a small amount of catalyst can be added to the porous electrodes. The catalyst material can be a precious metal, doped zirconia, doped ceria or other mixed conductive oxides.

Figure 4A:
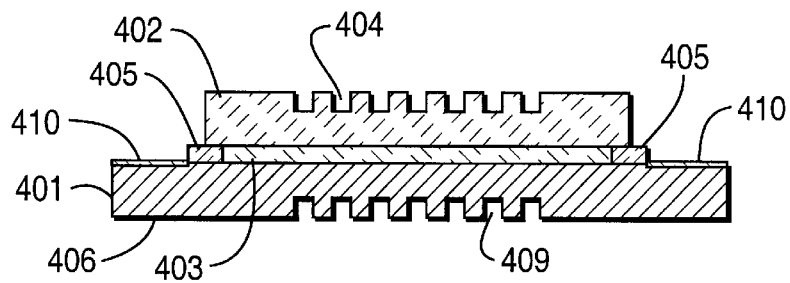
FIG. 4A is a cross sectional view of a ceramic interconnector of the invention.

FIG. 4A illustrates an alloy interconnector design of the invention.

The improved interconnector design of FIG. 4A comprises an alloy base plate 401, having a porous conductive ceramic contact layer 403 thereover and a dense conductive ceramic blocking layer 402 with air flow channels 404 machined in its exposed surface over the contact layer 403. These layers are connected together with a bonding and protective glass 405. The contact layer 403 provides electrical contact between the base plate 401 and the blocking layer 402. The blocking layer 402 prevents air from contacting the center portion of the alloy base plate 401. The sealing glass 405 bonds the alloy base plate 401 and the blocking layer 402 together. The external surface 406 of the base plate 401, that has fuel channels 409 machined therein, is also covered where exposed at 410 with a sealing glass to prevent high temperature corrosion. The machined external surfaces 406 can be coated with a metal, such as nickel, copper or iron, again to prevent corrosion at high temperatures. The machined channels 409 can be small, and patterned to optimize air flow distribution.

Figure 4B:
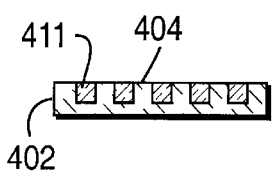
FIG. 4B is a cross sectional view of an alternate design for the ceramic blocking layer.
Figure 4C:
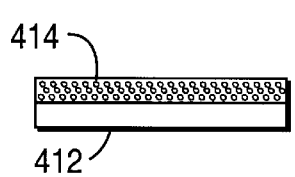
FIG. 4C is a cross sectional view of an another design for the ceramic blocking layer.

As shown in FIG. 4B, the dense conductive ceramic blocking layer 402 can have a porous conductive oxide component 410 in the air channels 404, or, as shown in FIG. 4C, can be constructed of a two-part dense conductive plate 412 and a porous conductive plate 414. The porous component will decrease the interface resistance of the interconnector with the cathode, but without sacrificing the air transport capability in the conductive ceramic blocking layer 402. A suitable material for the conductive contact and blocking layer is a doped lanthanum manganite, such as $La_{0.8}Sr_{0.2}MnO_3$.

Figure 4D:
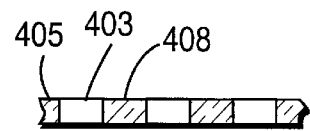
FIG. 4D illustrates glass inserts in a ceramic contact layer.

The contact layer 403 can be dense or porous. The bonding or sealing glass 405 can be applied not only to the edge of the ceramic blocking layer 403, but also in some center spots, as shown at 408 of FIG. 4D. These extra bonding spots will provide stronger bonding between the base plate 401 and the dense conductive ceramic blocking layer 402. The sealing glass spots 408 provide electrical connection between the conductive blocking layer 402 and the alloy base plate 401.

The sealing glass 405 provides a reliable gas-tight seal between the air chamber of the cathode and the fuel chamber of the anode, and provides strong bonding of the three-layer cell to the interconnector to ensure low electrical resistance at the interface. The sealing glass 405 will enhance bonding between the cathode and the interconnector. A compressive gasket seal between repeating cell units, and a flexible contact of the anode with the interconnector, as discussed hereinbelow, will readily release any stress in the stack during operation and thermal cycling. This feature results in excellent operational stability of the stack. A ceramic spacer serves as an electrical insulation layer between cell units.

Suitable sealing glasses deform at temperatures in the range 780–980° C. and can be fired between 800–950° C. They have a thermal coefficient of expansion (TCE) between about 10.5–12.0 ppm/° C. Glasses that are suitable for use in the present invention can be chosen from the following illustrative compositions of Table 1, given in mol percent;

however, other glasses can be used provided they have the correct deformation and firing temperatures, and TCE.

TABLE 1

| Glass | MgO | BaO | $B_2O_3$ | $SiO_2$ | CaC | ZnO | $Al_2O_3$ |
|---|---|---|---|---|---|---|---|
| 1 | 47.5 | 16.1 | 15.0 | 21.4 | | | |
| 2 | 45.0 | 15.0 | 15.0 | 25.0 | | | |
| 3 | 47.0 | 11.5 | 16.5 | 20.0 | | 5.0 | |
| 4 | 49.0 | 7.0 | 21.0 | 15.0 | | 8.0 | |
| 5 | 46.7 | 15.6 | — | 7.5 | | | |
| 6 | — | 40.0 | 20.0 | 30.0 | 10.0 | | |
| 7 | — | 50.0 | 10.0 | 30.0 | | | 10.0 |

The improved interconnector of the invention provides more choices for the alloy plate 401 for better matching of TCE; provides better air flow distribution; provides low surface electrical resistance; and provides long term and normal cycle stability of the fuel cell stacks.

In order to make an interconnector of the invention, we have found that a ferritic stainless steel alloy type 430 having a CTE of 10–12 ppm/° C., good mechanical strength and adequate corrosion/oxidation resistance at 800° C., can be used to make satisfactory interconnectors. This material is structurally sound, has high thermal conductivity and provides good support for fuel and oxidant gas manifolds, and can be sealed. This interconnector does not require metal machining.

A planar metal base is coated with a layer of corrosion-resistant nickel by plating or cladding. Noble metal contacts are then screen printed onto selected areas of the nickel surface and are sintered to protect the nickel from oxidation during ceramic bonding. The nickel forms a stable interface with the ferrite alloy and can withstand firing temperatures of up to 950° C. The nickel layer is then oxidized in the non-contact areas on the cathode side to facilitate ceramic bonding. On the fuel side, the nickel does not oxidize in fuel gas atmosphere, thereby providing good contact.

A ceramic layer is then bonded to the nickel coated surface by high temperature firing. Electrical contacts between the alloy to a top surface of a ceramic are formed in the ceramic by forming vias in the green tape used to make the ceramic in known manner, and then screen printing a conductive material or ink to fill the vias. Gas and air channels are readily formed in the green tape, as by punching, machining or embossing, prior to firing the green tape.

The contact vias are filled with a noble metal, using a noble metal-glass conductor ink, in known manner, to form the contacts. As examples, the noble metal can be palladium, platinum, palladium-silver alloy, silver or gold. A conductive oxide such as ruthenium oxide can also be used. After firing, the electrical contacts are hermetically bonded to the ceramic body. By keeping the contact size small, use of expensive noble metals can be minimized.

By using a suitable low firing temperature bonding glass over the metal surfaces, the ceramic layers shrink only in the z or thickness direction, but not in the x and y directions. Thus the locations of the features in the ceramic structure are not changed during the firing step.

The bottom or fuel side of the interconnector is then cleaned to remove the surface oxide and expose the nickel metal for good electrical contact.

Figure 5A:
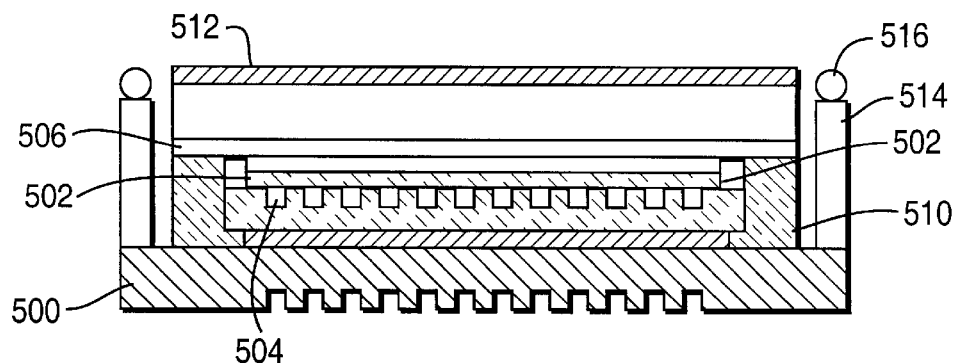
FIG. 5A is a cross sectional view of an anode supported fuel cell repeating unit on an interconnector.

FIG. 5A shows an anode supported SOFC repeating unit of the invention having a metal alloy planar base plate 500. A ceramic layer 502 having gas and air channels 504 is formed in a green tape stack and vias for noble metal contacts (not shown) are screen printed with a noble metal conductor ink to fill the vias prior to firing. The gas and air channels 504 can have various shapes and directions which are punched into the green tape stack. A bonding glass 510 adheres the metal base 500 to the green tape layers 502, thus preventing shrinkage in the x and y directions during firing. The bonding glass 510 also provides a hermetic seal against the oxidant gas. The noble metal contacts provide a stable electronic path from the metal base plate 500 to the top of the of the ceramic layer 502. The noble metal contacts are not affected by an oxidizing atmosphere and provide a low resistance contact between the metal base 500 and the cathode 506. They are sealed by the ceramic layer 502. A sealing layer 512 adheres one SOFC to another. The exposed interconnector surface is cleaned to remove surface oxide from the nickel layer exposed surface. A ceramic spacer 514 and a metal gasket 516 provide support between adjacent interconnectors.

Figure 5B:
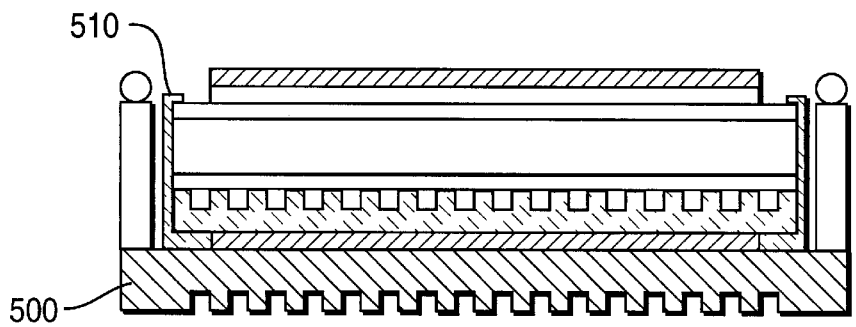
FIG. 5B is a cross sectional view of a cathode supported fuel cell repeating unit on an interconnector.

FIG. 5B shows a like repeating cell unit of a cathode-supported SOFC of the invention. In this case the sealing glass 510 extends from the base layer 500 to the top of the fuel cell.

Figure 5C:
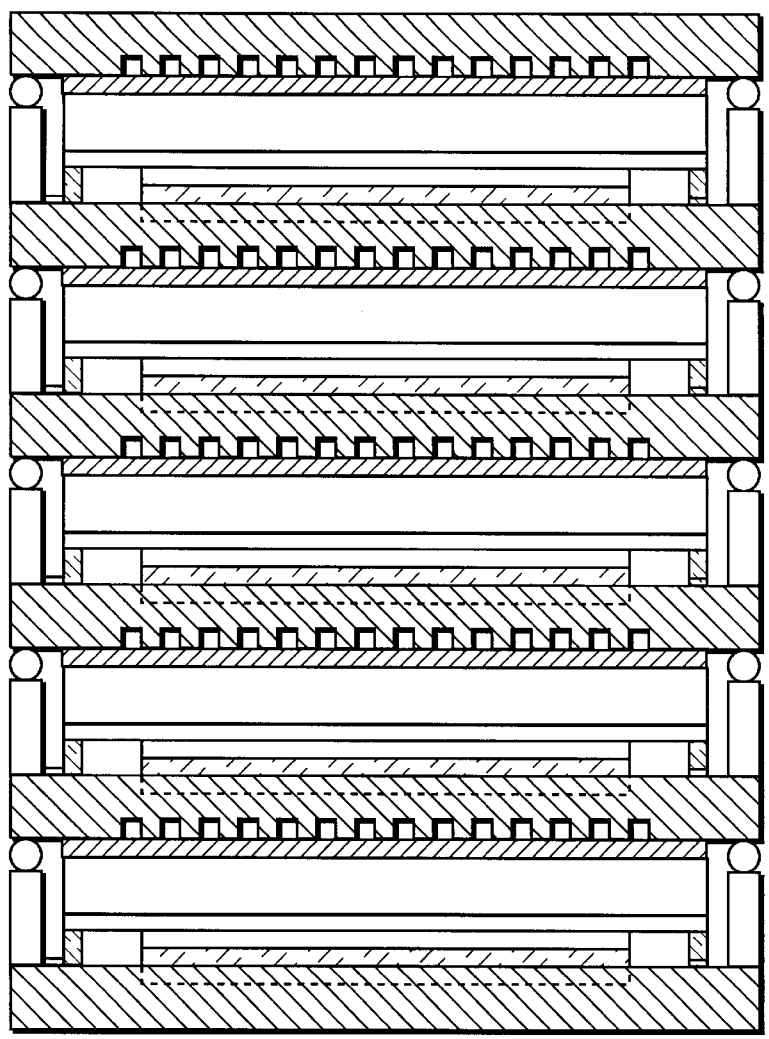
FIG. 5C is a cross sectional view of a fuel stack of the fuel cells of FIG. 5A.

FIG. 5C illustrates a stack of the repeating units of FIG. 5A.

Another advantage to this design is that it is eminently scalable, from a fraction of a square inch to many hundreds of square inches, suitable for large area SOFC designs.

The prior art process to produce multilayer ceramic devices is to cast green tape from a mixture of metal oxides and glass precursors, and one or more organic materials including dispersants, binders and plasticizers. The green tape layers are stacked and laminated at predetermined pressures and temperatures to obtain a multilayer structure. The green tapes are then fired to sinter the glass and burn off the organic additives. The resultant ceramics are not fully densified. If a thin film layer such as an electrolyte layer is included in a neutral structure, problems arise of handling thin film layers and of laminating them to preserve a thin film layer having a uniform thickness.

To overcome these problems, in accordance with the invention, a thin electrolyte precursor film is cast onto a sacrificial carrier tape, using a limited amount of organic materials, resulting in a high ceramic particle packing density. A second electrode layer is cast over the electrolyte layer to obtain a bi-layer tape. The solvents in the second layer are carefully chosen so that they do not dissolve the binders in the first layer, i.e., the second layer can be completely dried before the binders in the first layer are substantially dissolved. The concentration of binders in the second layer can then be optimized for desired sintering, shrinkage and porosity properties.

Thus the high particle density of the electrolyte layer results in lowering the sintering temperature required, which in turn decreases manufacturing costs and provides more options in the choice of suitable materials. Further the solvent for the second layer is chosen for its low dissolution of the first layer binders, and also provides good bonding between the two layers.

In order to reduce the amount of expensive noble metal used to form the contacts, they can be reduced in size and fewer of them can be employed. However, in such case, care must be taken so that lateral conduction does not occur before the current finds an interconnect contact.

As an alternative, the number of vias in a green tape stack can be reduced substantially, if a thin noble metal coating can be applied to the surface of the electrode and fired. This will produce a low resistance lateral path for current on the surface of the electrodes.

Because partially stabilized zirconia (PSZ) has 5–10 times the mechanical strength of prior supports, and better thermal shock resistance than fully stabilized $ZrO_2$, the fuel cell has improved mechanical properties using a thinner support layer. This thinner support layer reduces materials cost and reduces the gas diffusion distance in the porous substrate for better performance. The electrode performance and electrical conduction however are not affected.

Figure 6:
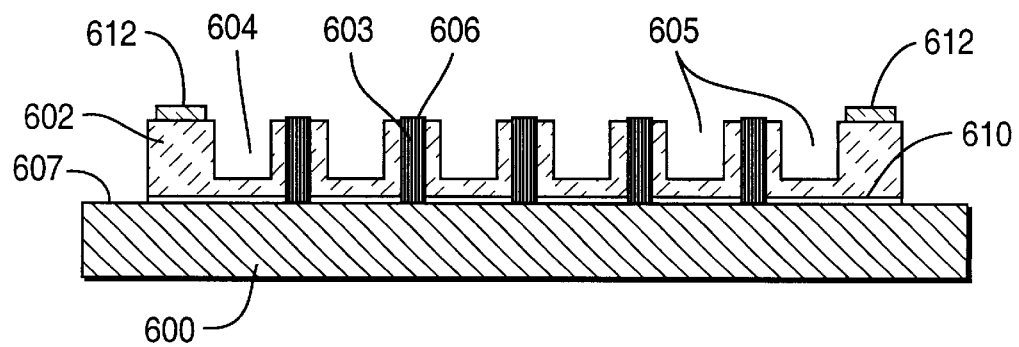
FIG. 6 illustrates filled contact vias in a ceramic layer bonded to a metal alloy base.

FIG. 6 is a cross sectional view illustrating a new interconnector structure particularly for use with green tape stack precursors to ceramic layers.

Referring to FIG. 6, a layer of a green tape stack that has been fired to form a ceramic layer 602, having via openings 603 and gas and air flow channels 604 formed therein, as by embossing, is mounted on a metal alloy base plate 600. The metal alloy base plate 600 has a patterned layer of bonding glass 610 thereover. This bonding glass layer is deposited so that the upper surface 607 of the metal alloy base layer 600 is exposed where filled conductive vias 606 are to be formed. The bonding glass layer 610 also prevents shrinkage during firing of the green tape stack and ensures that the filled vias 606 do not shift their position with respect to the glass coated metal alloy base layer 600 during firing of the green tape. A low melt temperature glass 612 is deposited on the ends of the ceramic layer 602 for sealing to a ceramic spacer (not shown).

The invention will be further described in the following Examples. However, the examples are illustrative only and are not meant to limit the scope of the invention.

EXAMPLE

Part A. This example illustrates preparation of a multilayer cell with a carrier tape suitable for making the electrolyte layer.

50 Grams of YSZ, ground to a particle size of about 0.2 micron, 1 gram of fish oil and 40 grams of methylethylketone were ball milled to thoroughly disperse the YSZ powder.

Polyvinyl butyral (2.5 grams), polyethylene glycol (2.5 grams), and 10 grams of methylethylketone were added while ball milling to dissolve the binder in the slurry.

The resultant slurry was stirred under vacuum to remove any entrained air bubbles and to adjust the slurry viscosity. The slurry was cast onto a polyethylene terephthalate tape so that the dried green tape is from about 0.3–1 mil in thickness.

Part B. 25 Grams of YSZ, 25 grams of nickel oxide, 1 gram of fish oil, 20 grams of methylethylketone and 20 grams of ethanol were ball milled to disperse the solid powders. 2.5 Grams of an acrylic binder, 2.5 grams of polyethylene glycol, 10 grams of methylethylketone and 5 grams of ethanol were added and ball milling was continued to dissolve the binder in the slurry. The slurry was stirred under vacuum to remove entrained air and to adjust the slurry viscosity.

The slurry was cast onto the thin, dried green tape layer made in Part A so as to obtain a bi-layer green tape about 4–10 mils in thickness. The bi-layer was dried in air.

Additional green tape layers can be deposited as required to obtain a desired multilayer green tape thickness.

The multilayer green tape is dried, punched to a desired shape and size, and sintered at an elevated temperature of 1150–1400° C. The resultant bi-layer is a nickel oxide-YSZ substrate supporting a dense, thin YSZ electrolyte layer.

Figure 7A:
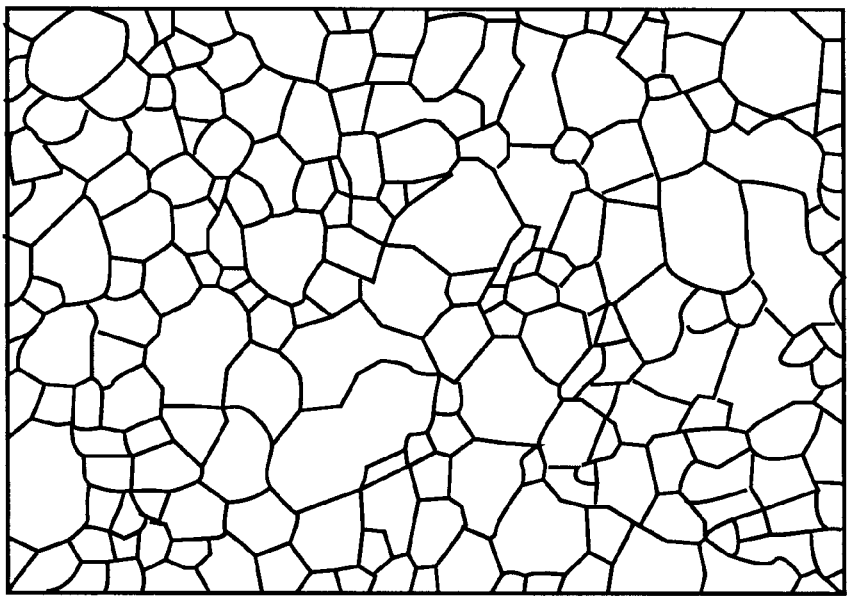
FIG. 7A is an SEM of YSZ electrolyte sintered at 1300° C.
Figure 7B:
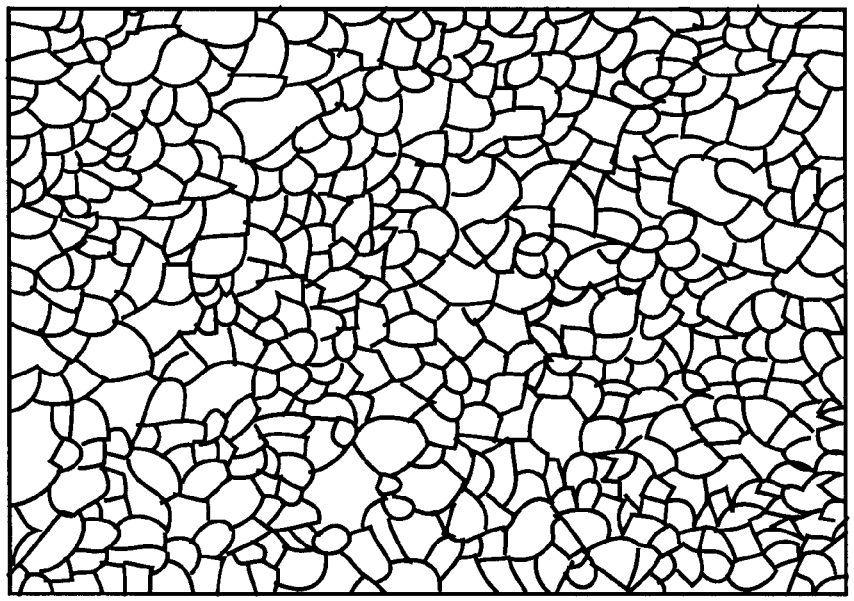
FIG. 7B is an SEM of YSZ electrolyte sintered at 1200° C.

As shown in FIGS. 7A and 7B, the YSZ electrolyte is fully densified (no voids) at temperatures of 1300° C. (FIG. 7A) and even at temperatures as low as 1200° C. (FIG. 7B) This low sintering temperature avoids reactions between the electrolyte and the electrode materials, and thus improves the fired interfaces and avoids damage to the thin film layer. Still further, low sintering temperatures enable firing in a single step. The anode, electrolyte and cathode can be cast, screen printed and sintered in one sintering step.

The low firing temperature also permits use of all-oxide anode materials, such as composites of doped lanthanum chromite ($LaCrO_3$) with YSZ, or a composite of doped $SrTiO_4$ with YSZ, in addition to Ni-YSZ and Cu-YSZ. When doped $LaCrO_3$ or doped $SrTiO_4$ are used as the conductive anode, ionic conductive oxides, such as YSZ or doped $CrO_2$, can be used as the conductive component.

A small amount of catalyst can be added to either or both of the electrodes Suitable catalysts include precious metals, doped $ZrO_2$ doped $CeO_2$, or other mixed conductive oxides.

Cathode supported cells are preferred over anode supported cells because they can use alternative anode materials for hydrocarbon fuel cells without pre-reforming, and to obtain better cell performance. All-oxide anodes are tolerant of impurities such as sulfur, and thus high sulfur fuels can be used. Also, they can be heated and cooled without a protective gas layer, due to their high stability in an oxidizing atmosphere, which simplifies SOFC system design.

Still another advantage is that the thin film electrolyte layer is supported by an electrode layer during firing, thus avoiding damage to the thin film electrolyte layer.

In order to better monitor the performance of SOFCs, embedded sensors can be incorporated as screen printed metal films on green tapes, as by ink jet printing. The sensor film can be applied to individual tape layers of the multilayer green tape stack, and laminated. After firing, the laminate is bonded to the metal base plate. The sensors can be embedded in the green tape, or exposed by placing on the top green tape layer. Internal and sensor connection wiring can be readily screen printed onto a green tape and connected with conductive vias. After firing, the multilayer green tape stack forms a monolithic body including the sensors and the exposed connections. The sensors can comprise known transition metal thermistors and thermally sensitive resistors that are integrated into the interconnect structure. They can also be fabricated of ceramic, metal, or a combination of materials to perform various sensing functions.

Figure 8:
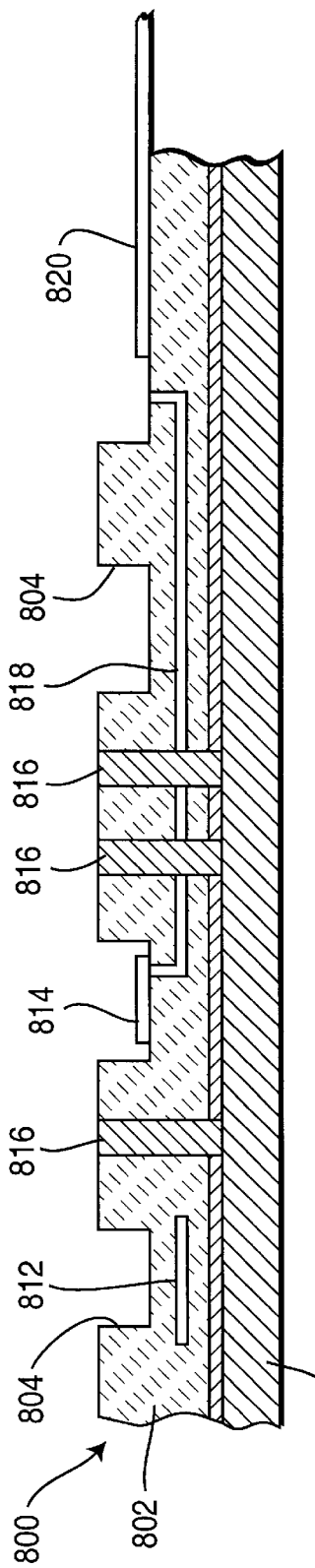
FIG. 8 illustrates a ceramic layer as in FIG. 7 having integrated sensors therein.

FIG. 8 illustrates an interconnector 800 having a metal alloy base plate 810; a ceramic layer 802 bonded thereto; the ceramic layer 802 having air and fuel channels 804 formed therein; embedded sensors 812 and exposed sensors 814 deposited on or in the ceramic layer 802; metal filled contact vias 816, internal wiring 818 formed by depositing on a buried green tape, and a sensor connection line 820 extending beyond the interconnector 800.

The above SOFCs and interconnectors provide stack performance of about 0.6W/cm$^2$ at 0.7 volt/cell; and an operating life of over 40,000 hours in a cell stack operating at 800° C.

Applications for the SOFCs described above include stationary power plants, on-site co-generation power plants, dispersed electric generators and base loaded electric power plants that run on coal gas. These power plants may be used as portable power units in environmentally restricted areas and at remote locations. The present fuel cell stacks can be integrated into power modules. Increased power capacity can be obtained simply by adding additional modules.

The SOFCs of the invention can also be used as stand-alone power sources to run individual devices, integrated circuits or complete systems.

Figure 9:
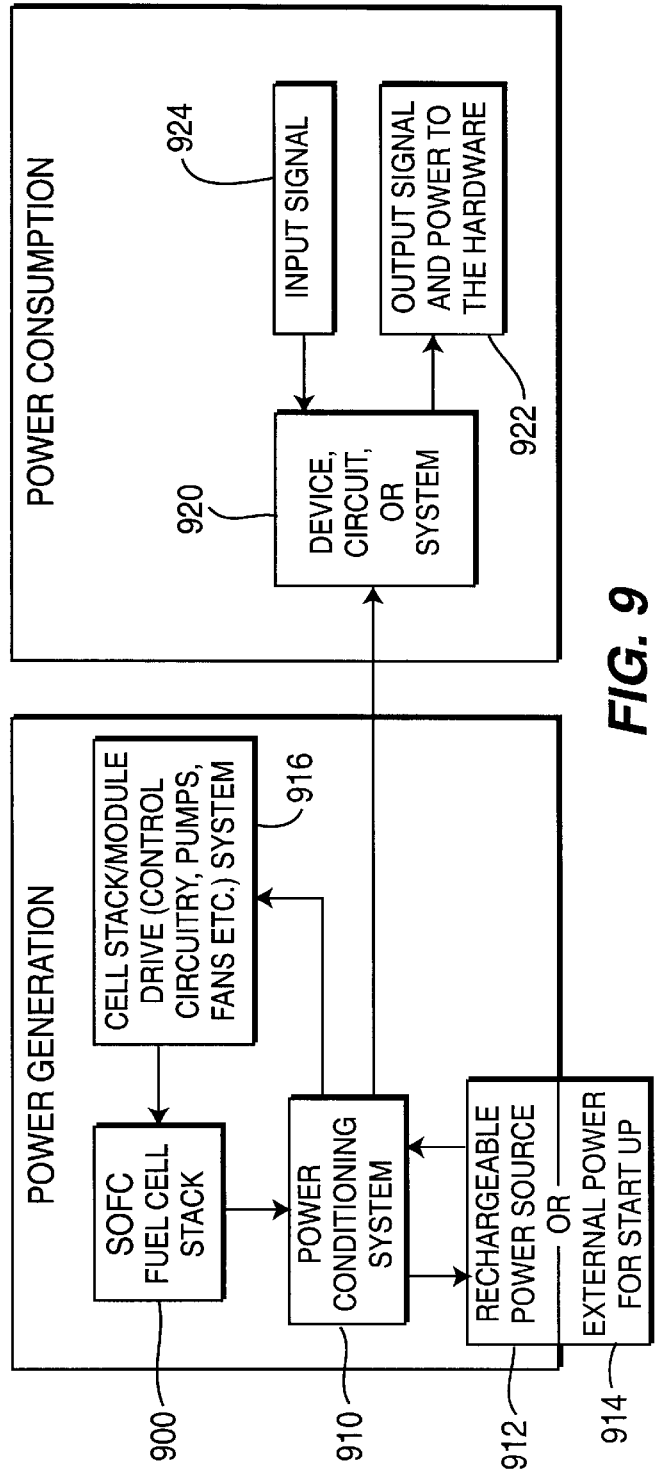
FIG. 9 is a schematic view of power generation and consumption by the present fuel cell stacks.

FIG. 9 is a schematic view of an apparatus for powering a load to the present SOFC stacks, as from an external power source to initiate power output by the SOFCs. An SOFC stack 900 of the invention is connected to a power conditioning system 910, in turn connected to a start-up power source such as a rechargeable power source 912 or an external power supply 914. The power conditioning system 910 in turn in connected to systems 916 such as control circuitry, pumps, fans and the like.

After powering the power conditioning system 910, it can be connected to various devices, circuits or systems 920 that consume the power generated by the SOFC, such as an output signal 922 that can power hardware. An input signal 924 indicates that the power generation system is operating.

Although the invention has been described in terms of particular embodiments, the invention is not meant to be limited to the details described herein. The invention is only meant to be limited by the scope of the appended claims

We claim:

1. A method of making thin film solid oxide fuel cells comprising
    a) forming a slurry of a metal oxide together with a limited amount of an organic vehicle to provide a high particle density mixture,
    b) casting the slurry onto a carrier tape to make a thin film electrolyte layer,
    c) casting a first electrode layer over the electrolyte layer,
    d) removing the carrier tape,
    e) screen printing a second electrode layer on the exposed electrolyte layer, and
    firing at a temperature of 1100–1300° C. to remove the organics and densify the electrolyte layer.

2. A method according to claim 1 wherein the layers are laminated prior to firing.

3. A method according to claim 1 wherein the organics in the electrode layers are chosen so they do not dissolve the binders in the thin film electrolyte layer.

4. A method according to claim 1 wherein the first electrode comprises an electrode layer over a support layer.

5. A method according to claim 4 wherein the support layer is a porous composite of nickel and partially stabilized zirconia (PSZ) containing about 3% of yttria about 100–2000 microns thick.

6. A method according to claim 5 wherein the composite layer is about 100–2000 microns thick.

7. A method according to claim 5 wherein the composite layer is about 200–500 microns thick.

8. A method according to claim 1 wherein the electrolyte layer is an 8% yttria stabilized zirconia layer.

9. A method according to claim 8 wherein said electrolyte layer is about 5–50 microns in thickness.

10. A method according to claim 8 wherein the electrolyte layer is deposited over a porous nickel-yttria stabilized zirconia layer about 100–2000 microns in thickness.

11. A method according to claim 10 wherein the second electrode layer is a strontium-doped lanthanum manganite-yttria stabilized zirconia composite up to 50 microns thick.

12. A method according to claim 11 wherein the composite layer is about 10–20 microns thick.

13. A solid oxide fuel cell comprising an anode layer, a cathode layer and an electrolyte layer between them having a supported electrode layer of lanthanum manganite-yttria stabilized zirconia composite.

14. A solid oxide fuel cell according to claim 13 wherein the anode layer is nickel-yttria stabilized zirconia.

15. A solid oxide fuel cell according to claim 13 wherein the electrolyte layer is a fully densified yttria stabilized zirconia.

16. A solid oxide fuel cell according to claim 13 wherein the cathode layer is strontium doped lanthanum manganite-yttria stabilized zirconia.

17. A solid oxide fuel cell according to claim 13 wherein the support is a strontium doped lanthanum manganite.

18. A solid oxide fuel cell according to claim 13 mounted on a metal interconnector having a base plate, machined grooves in one face of the base plate, and a dense conductive ceramic blocking layer having air flow channels machined therein and a porous conductive ceramic contact layer between them.

19. A fuel cell according to claim 18 wherein the base plate and the blocking layer are sealed at their edges by a sealing glass that bonds the blocking layer to the base plate.

20. A fuel cell according to claim 18 wherein the blocking layer comprises a dense conductive plate and a porous conductive plate thereover.

21. A fuel cell according to claim 18 wherein the blocking layer has openings in one face thereof filled with a porous conductive oxide.

22. A fuel cell according to claim 18 wherein the conductive ceramic contact layer is cut and sealed together with a sealing glass.

23. A fuel cell according to claim 18 wherein a plurality of fuel cells bonded to the interconnector are stacked together so the cathode of one cell is connected to the anode of a second cell.

24. A solid oxide fuel cell according to claim 13 mounted on a metal interconnector having a green tape stack, having gas and air flow channels and via holes formed therein, wherein the vias are filled with a conductor, said metal interconnector having a bonding glass deposited thereon adjacent to the green tape stack except beneath the filled vias, and a layer of low temperature glass over the exposed ends of the green tape stack.

25. A fuel cell according to claim 24 wherein stacked cells have a ceramic spacer layer and a compressive sealing gasket between the interconnectors.

26. An interconnector of claim 24 wherein sensors are embedded in the green tape stack prior to firing.

27. An interconnector of claim 26 wherein the sensors are screen printed onto the top of the green tape stack prior to firing.

28. An interconnector of claim 26 wherein wiring lines are screen printed onto a buried green tape layer prior to firing to connect one sensor to another sensor.

29. An interconnector of claim 28 wherein a wiring line is connected to an exterior lead line.

30. An interconnector of claim 26 wherein the wiring lines are screen printed onto a buried green tape layer prior to firing to connect one sensor to another sensor.

31. An interconnector according to claim 24 wherein sensors are deposited onto exposed surfaces of the green tape stack.

32. A solid oxide fuel cell according to claim 13 mounted on a planar metal base plate covered with a nickel layer bonded to a ceramic layer having air and fuel channels formed therein and contact vias filled with a conductor.

33. A fuel cell according to claim 32 wherein a glass bonding layer adheres the metal base to the ceramic layer.

34. An apparatus for powering a load comprising a solid oxide fuel cell stack and a load, wherein the solid oxide fuel cell comprises an anode layer, a cathode layer and an electrolyte layer between them having a supported electrode layer of lanthanum manganate-yttria stabilized zirconia composite.

35. An apparatus according to claim 34 wherein said solid oxide fuel cell is mounted on a metal interconnector having a base plate, machined grooves in one face of the base plate, and a dense conductive ceramic blocking layer having air flow channels machined therein and a porous conductive ceramic contact layer between them.

36. An apparatus according to claim 34 wherein the load is one of a circuit, device or system.

* * * * *